United States Patent
Schmitt et al.

(10) Patent No.: US 10,307,834 B2
(45) Date of Patent: Jun. 4, 2019

(54) CUTTING TOOL SUITABLE TO ALLOW A BALANCED SETTING

(71) Applicant: SECO-E.P.B., Bouxwiller (FR)

(72) Inventors: Michel Schmitt, Balbronn (FR); Claude Jaeger, Monswiller (FR)

(73) Assignee: SECO—E.P.B., Bouxwiller (FR)

( * ) Notice: Subject to any disclaimer, the term of this patent is extended or adjusted under 35 U.S.C. 154(b) by 0 days.

(21) Appl. No.: 15/528,490

(22) PCT Filed: Nov. 16, 2015

(86) PCT No.: PCT/EP2015/076710
§ 371 (c)(1),
(2) Date: May 19, 2017

(87) PCT Pub. No.: WO2016/079064
PCT Pub. Date: May 26, 2016

(65) Prior Publication Data
US 2017/0259346 A1    Sep. 14, 2017

(30) Foreign Application Priority Data
Nov. 20, 2014  (FR) ..................................... 14 61251

(51) Int. Cl.
*B23B 29/034*    (2006.01)

(52) U.S. Cl.
CPC .... *B23B 29/03407* (2013.01); *B23B 2250/04* (2013.01); *B23B 2260/056* (2013.01)

(58) Field of Classification Search
CPC ... B23B 29/03; B23B 29/04; B23B 29/03403; B23B 29/03407; B23B 29/0341; B23B 29/03435; B23B 29/03439
See application file for complete search history.

(56) References Cited

U.S. PATENT DOCUMENTS 3,518,738 A * 7/1970 Porter ............... B23B 29/03407
407/74
3,682,561 A * 8/1972 Lemery ................... B23B 29/02
408/153

(Continued)

FOREIGN PATENT DOCUMENTS

| FR | 1100125 A | 9/1955 |
| JP | H09309010 A | 12/1997 |
| JP | 2011194481 A * | 10/2011 |

OTHER PUBLICATIONS

Machine translation, JP9309010, Komine, T., Dec. 2, 1997.*

*Primary Examiner* — Daniel W Howell
*Assistant Examiner* — Chwen-Wei Su
(74) *Attorney, Agent, or Firm* — Corrine R. Gorski

(57) ABSTRACT

A cutting tool includes a main body suitable to be mounted pivotably about an axis of rotation. A cutting head is carried by a carrying member. The carrying member is mounted displaceably in translation on the main body along an axis perpendicular to the axis of rotation. A counterweight is displaceably mounted in translation on the main body along an axis perpendicular to the axis of rotation. The cutting tool also includes an adjusting spindle for the simultaneous adjustment of the carrying member with respect to the counterweight, arranged on either side of the axis of rotation of the main body.

7 Claims, 1 Drawing Sheet

(56) References Cited

U.S. PATENT DOCUMENTS

| | | | |
|---|---|---|---|
| 4,599,769 A * | 7/1986 | Latzko | B23B 29/03439 29/26 A |
| 8,684,638 B2 * | 4/2014 | Buck | B23B 29/03407 408/16 |
| 9,849,518 B2 * | 12/2017 | Da Silva | B23B 29/03417 |
| 2006/0239787 A1 | 10/2006 | Stadelmann et al. | |
| 2007/0084320 A1 * | 4/2007 | Frank | B23B 29/03414 82/158 |
| 2010/0054882 A1 * | 3/2010 | Frank | B23B 29/03407 408/143 |
| 2010/0061819 A1 | 3/2010 | Frank et al. | |
| 2013/0064616 A1 | 3/2013 | Nakamura et al. | |

* cited by examiner

CUTTING TOOL SUITABLE TO ALLOW A BALANCED SETTING

RELATED APPLICATION DATA

This application is a § 371 National Stage Application of PCT International Application No. PCT/EP2015/076710 filed Nov. 16, 2015 claiming priority of FR Application No. 1461251, filed Nov. 20, 2014.

TECHNICAL FIELD

The present disclosure relates to the domain of rotary cutting tools, and more particularly to the domain of cutting tools suitable to allow a setting of the cutting surface.

BACKGROUND

Currently, rotary cutting tools are formed by one or more cutting heads mounted rotatably around an axis of rotation of the cutting tool driven by the motor of a machine tool.

When the cutting tool is suitable to allow the setting of the cutting surface of the device, the cutting head is mounted on the cutting tool in such a way as to allow its radial displacement with respect to the axis of rotation of the cutting tool. This radial displacement of the cutting head towards or away from the axis of rotation thus allows a reduction or increase of the radius of rotation of the cutting head and therefore of the diameter obtained.

In order to avoid the generation of an imbalance during the rotation of the cutting head that might pose a risk of putting the cutting tool out of true, the cutting tool is traditionally equipped with a counterweight suitable for offsetting the centrifugal force of the cutting head during the operation of the tool. According to a known manner of construction, such a counterweight is also arranged to be radially displaceable and to allow a setting appropriate to the position of the cutting head on the tool.

The document US 2006/3239787 proposes an example of construction of such a tool comprising a counterweight that is radially adjustable so as to allow an offsetting of the weight of the cutting head. However, it should be noted that the mechanism for positioning and adjusting the counterweight on the cutting tool is structurally independent from the adjustment of the cutting head. Such a mechanism therefore has the disadvantage of requiring a double setting for a given cutting surface, namely, on the one hand, the adjustment of the cutting head according to a defined cutting radius, and, on the other hand, the balancing of the counterweight according to the position of the cutting head with respect to the axis of rotation.

SUMMARY

One of the aims of the present disclosure is to mitigate this disadvantage by proposing a mechanism that obviates the need for the said double setting thanks to a joint balancing simultaneous with the positioning of the cutting head on the rotary cutting tool.

The disclosure therefore concerns a cutting tool comprising:

a main body suitable to be mounted pivotably about an axis of rotation, a cutting head carried by a carrying member, the said carrying member being mounted displaceably in translation on the main body along an axis perpendicular to the axis of rotation, a counterweight mounted displaceably in translation on the main body along an axis perpendicular to the axis of rotation, characterised in that the cutting tool also includes an adjusting spindle for simultaneous adjustment of the carrying member with respect to the counterweight, arranged on either side of the axis of rotation of the main body.

The disclosure also concerns a cutting device comprising a rotary drive mechanism, characterised in that it incorporates at least one cutting tool according to the invention.

The invention will be better understood from the following description, which relates to a preferred form of embodiment, given by way of non-limitative example and explained with reference to the annexed schematic drawings.

DETAILED DESCRIPTION

Figure 1:
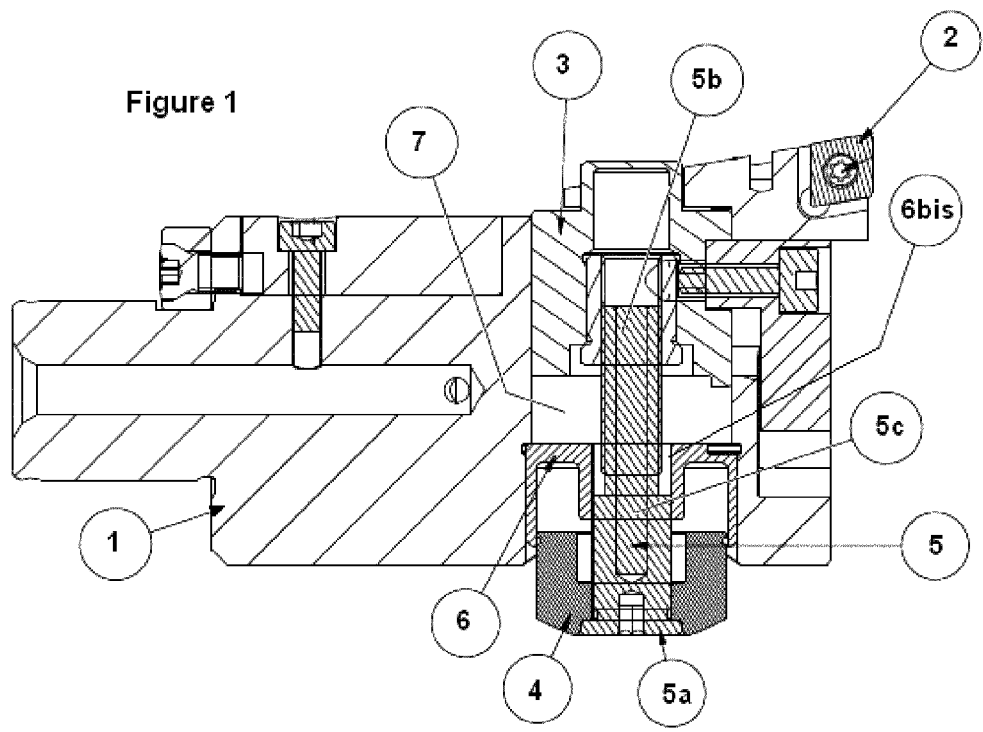
FIG. 1 is a schematic representation of an example of a cutting tool according to the present disclosure, illustrated according to a cross-section along the axis of rotation of the cutting tool.
Figure 2:
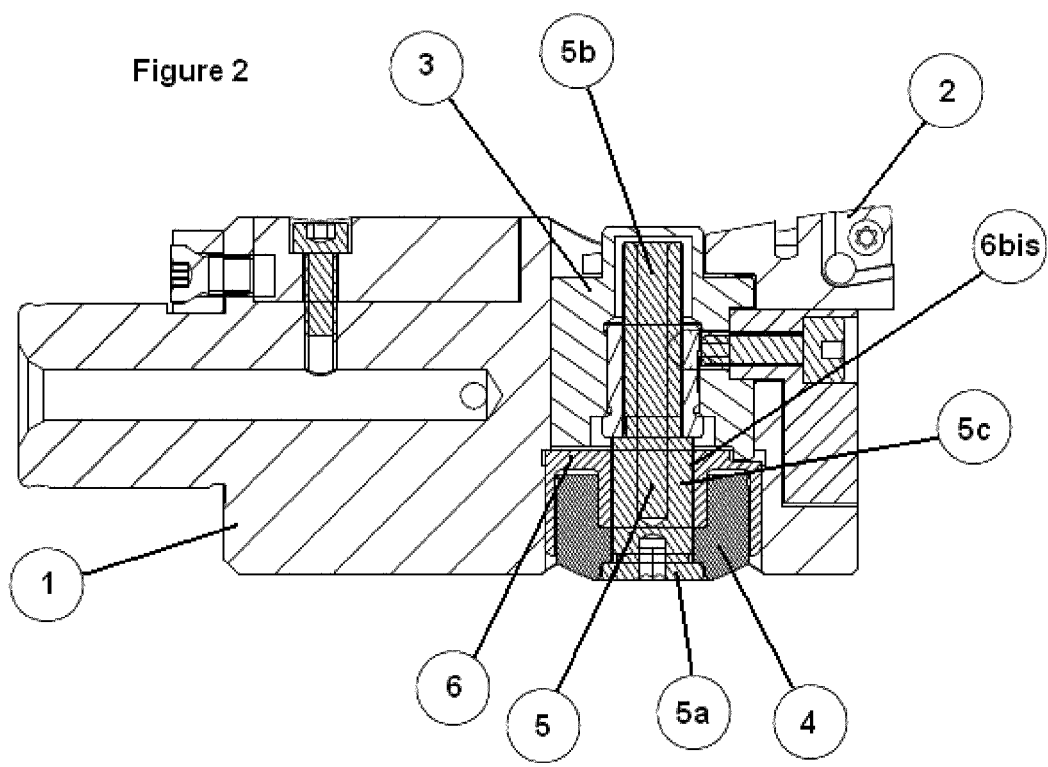
FIG. 2 is a schematic representation of an example of a cutting tool identical to that of FIG. 1, but wherein the cutting head and the counterweight have been displaced with respect to the axis of rotation of the cutting tool.

The present disclosure relates to a cutting tool comprising:

a main body 1 suitable to be mounted pivotably about an axis of rotation X, a cutting head 2 carried by a carrying member 3, the said carrying member being mounted displaceably in translation on the main body 1 along an axis perpendicular to the axis of rotation X, a counterweight 4 mounted displaceably in translation on the main body 1 along an axis perpendicular to the axis of rotation X, characterised in that the cutting tool also includes an adjusting spindle for simultaneous adjustment 5 of the carrying member 3 with respect to the counterweight 4, arranged on either side of the axis of rotation X of the main body.

Thus, the cutting tool of the disclosure includes an adjustment spindle 5 which cooperates jointly with the carrying member 3 and the counterweight 4. This cooperation thus allows a joint axial displacement of the carrying member 3 and the counterweight 4, so that at any point of the travel of the carrying member 3, the counterweight 4 is correctly positioned to counterbalance the carrying member 3.

It should be noted that the cutting head 2 and the carrying member 3 may be formed by two different structures or alternatively by a single structure where the cutting head 2 is formed by an end of the carrying member 3.

It should also be noted that the counterweight 4 also participates in counterbalancing the variation of inertia related to the variation of the diameter of rotation of the carrying member 3 surmounted by its cutting head 2.

According to a particular form of construction, the cutting tool is characterised in that the adjusting spindle 5 comprises:

a first end 5*a* which interacts with a first of the two parts that are the carrying member 3 and the counterweight 4, a second end 5*b* which interacts with the second of the two parts that are the carrying member 3 and the counterweight 4, an intermediate portion 5c which interacts with an opening 6 carried by the main body 1 of the tool.

According to this form of construction, the cooperation between the carrying member 3 and the counterweight 4 is thus effected by means of a simple mechanism involving only a single adjusting spindle 5 associated with the main body 1 of the tool in order to allow the adjusted displacement of the said parts with respect to each other and with respect to the main body 1 of the tool. Thus, the carrying member 3 and/or the counterweight 4 interact/s in a sliding manner with the adjusting spindle 5. Similarly, the adjusting spindle 5 interacts in a sliding manner with the opening 6 carried by the main body 1.

It should be noted that the opening 6 traversed by the adjusting spindle 5 and the main body 1 that carries the said opening may be formed by two different structures or alternatively by a single structure where the main body 1 comprises a part forming the opening 6 traversed by the adjusting spindle 5.

According to an additional characteristic of the cutting tool, the adjusting spindle 5 has at least one screw thread that cooperates, on the one hand, with the main body 1 and, on the other hand, with at least one of the two parts that are the carrying member 3 and the counterweight 4. The screw thread of the adjusting spindle 5 interacts with a tapped female thread of one of the two parts and thus allows a displacement of the adjusting spindle 5 with respect to the said part. Depending on the type of construction used, the adjusting spindle 5 may interact in this manner with one or both of the two parts that are the carrying member 3 and the counterweight 4.

Thus, when the carrying member 3 is locked in rotation while being capable of moving in translational motion in a guide groove, the axial rotation of the adjusting spindle 5 allows a sliding of the carrying member 3 in its guide groove, thanks to the thread/tapping cooperation between the said two parts.

Similarly, the thread/tapping cooperation between the adjusting spindle 5 and the opening 6 of the main body 1 allows a sliding by axial translatory motion of the adjusting spindle 5 in the opening 6, during the axial pivoting of the said adjusting spindle 5.

According to an additional characteristic of the cutting tool, the counterweight 4 is mounted fixed in translation with the adjusting spindle 5 at a first end of the adjusting spindle 5a, while the carrying member 3 comprises a bore cooperating with the adjusting spindle 5 during its displacement in translation on the main body 1. According to this characteristic, the adjusting spindle 5 interacts mainly with the carrying member 3 by means of a thread/tapping cooperation. The counterweight 4 is then mounted and associated in translation with the adjusting spindle 5. This association may be effected by a fixing of the counterweight 4 in translation and rotation with the adjusting spindle 5 or by a fixing only in translation, the said counterweight remaining rotationally independent of the adjusting spindle.

According to a non-limitative constructional specificity of the invention, the counterweight 4 is formed by a portion of the end of the adjusting spindle 5, so that the counterweight 4 and the adjusting spindle 5 together form a single structure.

According to a constructional specificity of the mechanism for adjustment and setting of the balancing of the counterweight 4, the adjusting spindle 5 comprises different screw threads on each of the portions of the adjusting spindle 5 in interaction with a part of the cutting tool. The said thread differences, i.e. the said differences in thread pitch, along the adjusting spindle 5 thus allow different interactions at each of the points of cooperation that are the adjusting spindle 5 and the carrying member 3 or the adjusting spindle 5 and the opening 6 carried by the main body 1. The said interaction differences thus make it possible to obtain different displacement and sliding motions of the said parts with respect to each other as a function of the axial rotation of the adjusting spindle 5.

According to a particularity of the said constructional specificity, the thread pitches at the two points of cooperation involving the adjusting spindle 5 are formed in such a way as to be reversed with respect to each other.

According to another constructional specificity, the adjusting spindle 5 comprises sections of different diameters at each of the portions of the adjusting spindle 5 in interaction with a part of the cutting tool. The said differences of section make it possible to facilitate the construction and assembly of the mechanism of the invention. Thus, when the section of one of the ends of the adjusting spindle 5 has a section with a diameter smaller than the diameter of the section of the spindle 5 that cooperates with the opening 6 carried by the main body 1 of the tool, the insertion of the adjusting spindle 5 in the opening 6 to a required operating position is facilitated. Moreover, the creation of an adjusting spindle 5 comprising sections of different diameters, also allows the creation of an adjusting spindle with different thread pitches. Each of the respective thread pitches of a portion of the adjusting spindle 5 interacts with a particular part of the cutting tool and participates in the displacement of the carrying member 3 and of the counterweight 4 in opposite directions.

According to another constructional specificity, the adjusting spindle 5 comprises a screw thread on the portion 5c in interaction with the opening 6 which has a pitch (p) that is half of that (2p) of the portion 5b in interaction with the carrying member 3. Thus, when the adjusting spindle performs an axial rotation, for example with a helicoidal motion, the counterweight 4 is displaced according to a value (p) with respect to the main body 1 that carries the opening 6, while the carrying member 3 is displaced according to a value (2p) with respect to the counterweight 4. The displacement of the carrying member 3 with respect to the counterweight 4 takes place in the opposite direction to the displacement of the counterweight with respect to the main body 1 that carries the opening 6. In addition, the displacement result makes it possible to obtain a displacement of the carrying member 3 with respect to the main body 1 according to a value (2p−p=p), i.e. the same as that of the counterweight 4 with respect to the main body 1 but in an opposite direction. The counterweight 4 and the carrying member 3 thus perform symmetrical displacements with respect to the main body 1.

According to another constructional particularity of the cutting tool of the invention, the carrying member 3, the counterweight 4 and the adjusting spindle 5 are arranged, at least in part, in a bore 7 of the main body 1 oriented along an axis perpendicular to the axis of rotation X. The said bore 7 of the main body 1 thus forms an interface, for example a groove or a channel, in which the carrying member 3 and the counterweight 4 are capable of sliding in translation. Similarly, it is at a portion of the said bore 7 that the opening 6 carried by the main body 1 of the tool is positioned. Thus, depending on the respective volumes and dimensions of the carrying member 3, the counterweight 4 and the adjusting spindle 5, the bore 7 may have different dimensions at each of the different portions that interact with the said components.

According to a preferred manner of construction of the mechanism according to the invention, the opening 6 carried by the main body 1 and traversed by the intermediate portion 5c of the adjusting spindle 5 is formed by a guide structure 6bis of the adjusting spindle 5, fixed in rotation and in translation with the main body 1 of the cutting tool. The fixing in rotation and translation of the guide structure 6bis to the main body 1 of the tool may be effected either by the mounting of a dedicated part on the main body 1 or by the creation of a member forming a structural assembly with the main body.

According to a preferred manner of construction and implementation of the mechanism of the invention, the axial rotation of the adjusting spindle 5 allows, via a thread/tapping cooperation:

a displacement, towards or away from each other, of the carrying member 3 and the counterweight 4, the said displacement being obtainable purely by the interaction of the adjusting spindle 5 with the carrying member 3 when the counterweight 4 is mounted fixed in translation with the adjusting spindle 5, a displacement, towards or away from each other, of the counterweight 4 and the opening 6 carried by the main body 1 of the tool.

Thus, the adjusting spindle 5 allows the positioning of the carrying member 3 with respect to the main body 1 simultaneously with the displacement of the counterweight 4, which allows a balancing thanks to its joint displacement with the adjusting spindle 5. The axial rotation of the adjusting spindle 5 positions the counterweight 4 with respect to the main body 1 via the opening 6, while maintaining, thank to their relative displacements, a balancing of the weights between the counterweight 4 and the carrying member 3.

The invention also concerns a cutting device comprising a rotary drive mechanism and incorporating at least one cutting tool according to the invention.

Of course, the invention is not limited to the manner of embodiment described and represented in the annexed drawings. Modifications remain possible, particularly from the point of view of the composition of the various components or by substitution of equivalent techniques, without thereby leaving the domain of protection of the invention.

The invention claimed is:

1. A cutting tool comprising:
    a main body arranged to be mounted pivotably about an axis of rotation;
    a cutting head carried by a carrying member, the carrying member being mounted displaceably in translation on the main body along an axis perpendicular to the axis of rotation;
    a counterweight mounted displaceably in translation on the main body along the axis perpendicular to the axis of rotation; and
    an adjusting spindle arranged to provide simultaneous joint adjustment of the carrying member with respect to the counterweight, arranged on either side of the axis of rotation of the main body, wherein the adjusting spindle includes a first end that interacts with a first of the carrying member and the counterweight, a second end that interacts with a second of the carrying member and the counterweight, and an intermediate portion that interacts with an opening carried by the main body of the tool, the carrying member, the counterweight and the adjusting spindle being movably arranged, at least in part, in a bore of the main body oriented along the axis perpendicular to the axis of rotation, the adjusting spindle including at least one screw thread that cooperates, on the one hand, with the main body and, on the other hand, with at least one of two parts that are the carrying member and the counterweight.

2. The cutting tool according to claim 1, wherein the counterweight is mounted and fixed in translation with the adjusting spindle at a first end of the adjusting spindle, the carrying member including a bore cooperating with the adjusting spindle during its displacement in translation on the main body.

3. The cutting tool according to claim 1, wherein the adjusting spindle includes different screw threads on each of the portions of the adjusting spindle in interaction with a part of the cutting tool.

4. The cutting tool according to claim 1, wherein the adjusting spindle includes a screw thread on the portion in interaction with the opening, which has a pitch that is half of that of the portion in interaction with the carrying member.

5. The cutting tool according to claim 1, wherein the adjusting spindle includes sections of different diameters at each of the portions of the adjusting spindle in interaction with a part of the cutting tool.

6. The cutting tool according to claim 1, wherein the opening carried by the main body and traversed by the intermediate portion of the adjusting spindle is formed by a guide structure for the adjusting spindle, fixed in rotation and in translation with the main body of the cutting tool.

7. A cutting device comprising:
    a rotary drive mechanism; and
    at least one cutting tool incorporated in the rotary drive mechanism, the at least one cutting tool including a main body arranged to be mounted pivotably about an axis of rotation, a cutting head carried by a carrying member, the carrying member being mounted displaceably in translation on the main body along an axis perpendicular to the axis of rotation, a counterweight mounted displaceably in translation on the main body along an axis perpendicular to the axis of rotation, and an adjusting spindle arranged to provide simultaneous joint adjustment of the carrying member with respect to the counterweight, arranged on either side of the axis of rotation of the main body, wherein the adjusting spindle includes a first end that interacts with a first of the carrying member and the counterweight, a second end that interacts with a second of the carrying member and the counterweight, and an intermediate portion that interacts with an opening carried by the main body of the tool, the carrying member, the counterweight and the adjusting spindle being arranged, at least in part, in a bore of the main body oriented along the axis perpendicular to the axis of rotation, the adjusting spindle including at least one screw thread that cooperates, on the one hand, with the main body and, on the other hand, with at least one of two parts that are the carrying member and the counterweight.

* * * * *